(12) United States Patent
Hemman et al.

(10) Patent No.: US 8,651,452 B2
(45) Date of Patent: Feb. 18, 2014

(54) VALVE WITH NOTCH PLATE HAVING ENHANCED STRENGTH

(75) Inventors: Corey J. Hemman, Altenburg, MO (US); Thomas A. Linhorst, Perryille, MO (US)

(73) Assignee: Ultraflo Corporation, Ste. Genevieve, MO (US)

( * ) Notice: Subject to any disclaimer, the term of this patent is extended or adjusted under 35 U.S.C. 154(b) by 0 days.

(21) Appl. No.: 13/127,391

(22) PCT Filed: Mar. 16, 2011

(86) PCT No.: PCT/US2011/028597
§ 371 (c)(1),
(2), (4) Date: May 3, 2011

(87) PCT Pub. No.: WO2011/126686
PCT Pub. Date: Oct. 13, 2011

(65) Prior Publication Data
US 2013/0015380 A1    Jan. 17, 2013

Related U.S. Application Data

(60) Provisional application No. 61/322,120, filed on Apr. 8, 2010.

(51) Int. Cl.
*F16K 35/00* (2006.01)
*F16K 51/00* (2006.01)

(52) U.S. Cl.
USPC ............................ 251/107; 251/109; 251/285

(58) Field of Classification Search
USPC .......... 251/107, 108, 109, 285, 286, 287, 101
See application file for complete search history.

(56) References Cited

U.S. PATENT DOCUMENTS

| 4,815,693 A | 3/1989 | James et al. |
| 5,490,660 A | 2/1996 | Kamezawa |

OTHER PUBLICATIONS

Brochure entitled Butterfly Valves/Operators/Actuators/Accessories—Ultraflo's Complete Product Line, © 2006 Ultraflo Corporation. All rights reserved. CPL Jun. 2006.

*Primary Examiner* — John K Fristoe, Jr.
*Assistant Examiner* — Michael R Reid
(74) *Attorney, Agent, or Firm* — Matthews Edwards LLC

(57) ABSTRACT

A valve having an improved multiple position notch plate providing a large number of selectable valve positions with enhanced strength, including in the travel stop limiting the range of movement of the valve handle connected to the valve member. The notch plate includes a plurality of intermediate notches extending only partially through a radial outer periphery thereof, at spaced locations along an arcuate path of movement of a detent element in connection with the valve handle. In one embodiment, the intermediate notches are disposed in radial outer tips of fingers defining a plurality of through notches extending completely through the notch plate, also for receiving the detent element for holding the handle. As a result a greater number of valve positions can be achieved, with robustness and strength to withstand hammer blows, kicking and the like.

19 Claims, 10 Drawing Sheets

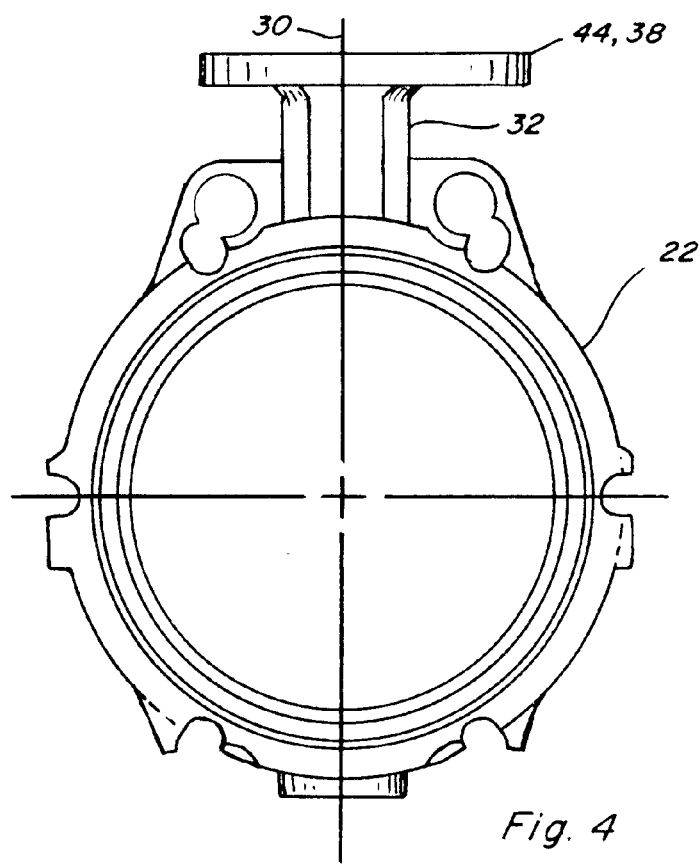
Fig. 4
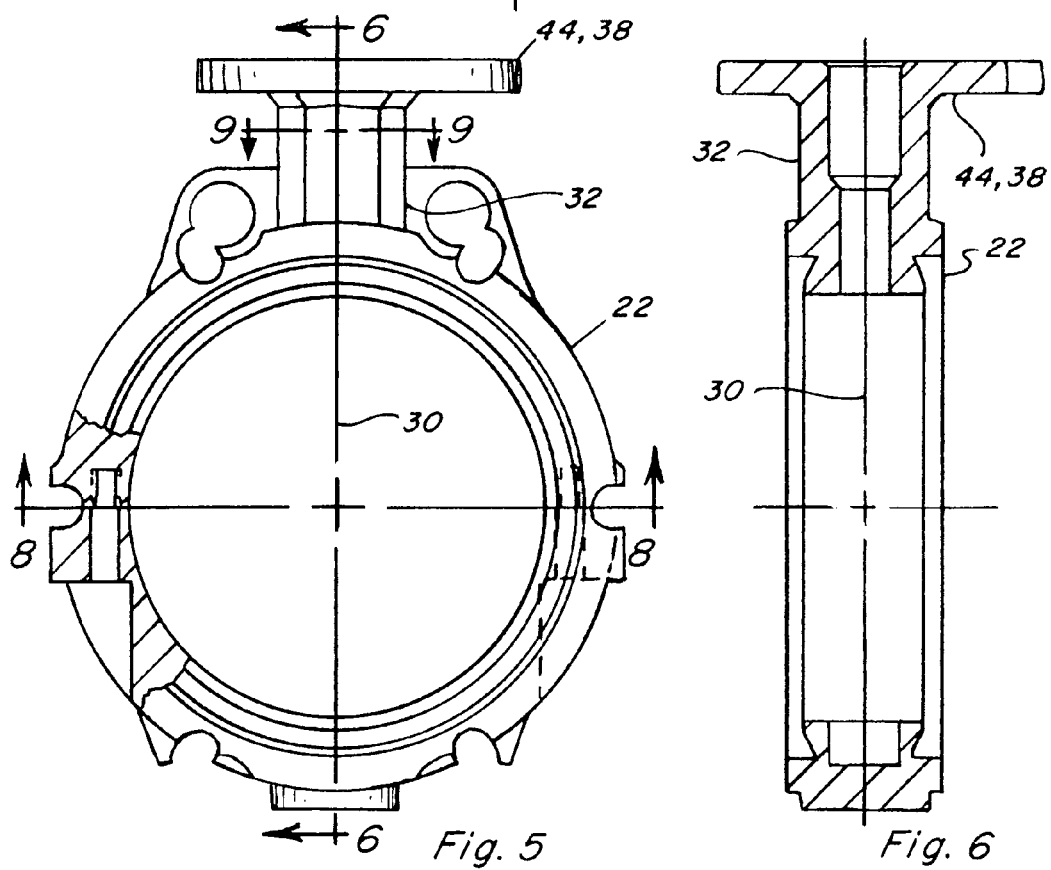
Fig. 5
Fig. 6

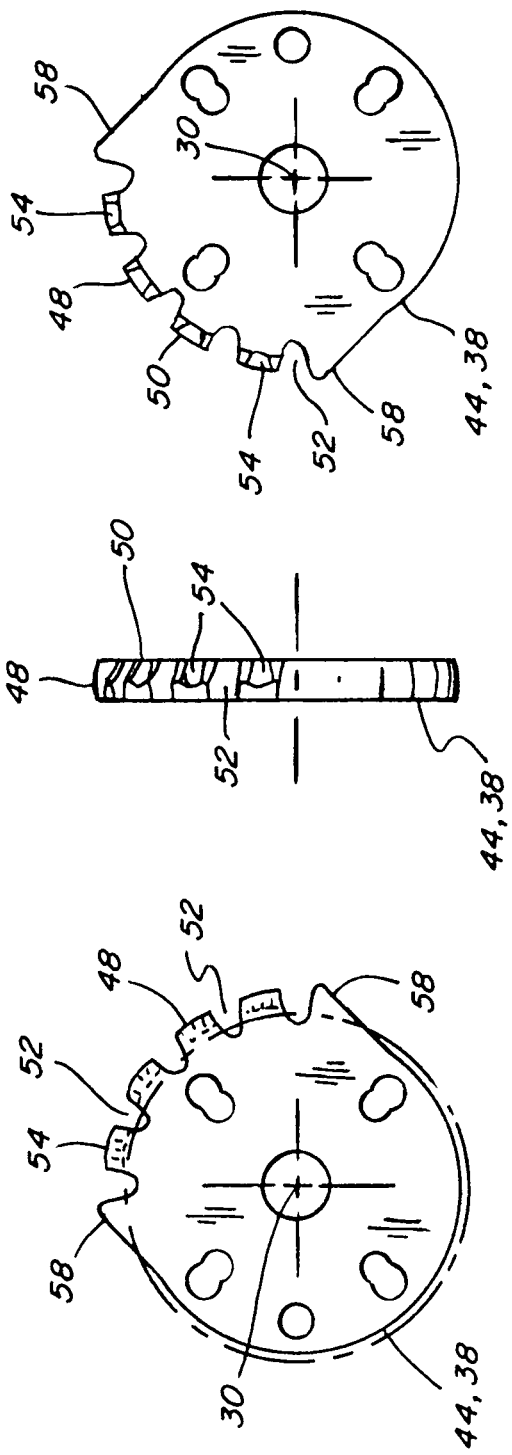

ously open positions, and the handle is typically rotated along an arcuate path about the stem body, to rotate the stem and the valve member within the valve body, to a selected position. The valve member must be securable in the closed position, and it is often desired to

VALVE WITH NOTCH PLATE HAVING ENHANCED STRENGTH

This application is submitted under 35 U.S.C. 371 claiming priority to PCT/US2011/28597, filed Mar. 16, 2011.

TECHNICAL FIELD

This invention relates to a valve having a notch plate, and more particularly, to an improved multiple position notch plate providing a large number of selectable valve positions with enhanced strength, including in the travel stop limiting the range of movement of the valve handle.

BACKGROUND OF THE INVENTION

Piping systems, such as those used to carry bulk materials, liquids, and the like, are often controlled using one or more multiple position valves which may be, for example, but are not limited to, butterfly and ball type valves, operated by a handle connected via a stem to the valve member. The valve members will typically have a closed position, a fully open position, and a range of partially open or intermediate positions between the closed and fully open positions, and the handle is typically rotated along an arcuate path about the stem body, to rotate the stem and the valve member within the valve body, to a selected position. The valve member must be securable in the closed position, and it is often desired to position and leave the valve member at the full or a partially open position to regulate flow through the piping system. To facilitate this, valves often include a notch plate mounted on the stem housing and including a row of notches defined by fingers positioned and configured to cooperatively receive a detent element such as a pin on the handle for holding it in the closed position, fully open position, and a selection of partially open positions. For piping systems used on trucks and trailers for carrying bulk particulate and powdered materials in at least the North America market, notch plates having either five or ten positions are the industry standards. The notch plates also typically include travel stops at the ends of the ranges of movement for preventing movement of the handle past the fully open and closed positions.

The known notch plates having a greater number of positions must have fingers that are relatively narrow. For strength, this necessitates that they be made from a relatively robust material such as steel. For aluminum valve stem housings, a separate steel notch plate is used, attached with fasteners, which increases cost and complexity.

In particular with regard to possible causes of damage to valve notch plates, during use, particulate and powdered materials can partially solidify and build up about the valve member within the valve body or housing, making movements to reposition or close the valve difficult. This can be the result of a variety of factors, including, but not limited to, inherent properties of the material, moisture, and/or temperature, e.g., freezing. The valves are often located beneath the bulk material containers of the truck or trailer, and thus are inconvenient to access, and truckers and other operators have been found to beat the handles with tools such as hammers and/or kick them, to free the valves. The detent element of the detent mechanism is often engaged with the notch plate of the valve as the handle is beaten, which can result in concentration of substantial forces against the notch plate, causing fingers to bend or break. This is a principal reason that notch plate fingers of weaker materials such as aluminum must be more robust and have fewer positions. A bent or broken finger, particularly for the closed position, can be a problem as it may prevent the valve from being securely held in that position.

Therefore, what is sought is a valve having a notch plate with enhanced strength, so as to be adapted to be cast in place on a valve housing or body of aluminum and other weaker and less durable materials, while provide more valve positions and greater adjustability.

DISCLOSURE OF THE INVENTION

What is disclosed is a valve having a notch plate which provides a multiple positioning capability for the valve member, with enhanced strength, and which incorporates one or more of the other features and capabilities set forth above.

According to a preferred aspect of the invention, the valve can be a butterfly type, ball type, or any other kind with a rotatable valve member. The valve includes a body or housing extending about a flow passage containing the valve member, which is movable relative to the valve body or housing through a range of positions. Representative valve positions can include, but are not limited to, a fully closed position, a fully open position, and a range of partially open positions. Such movement preferably comprises about a 90 degree rotational movement and is effected by a handle in connection with the valve member, e.g., via a valve stem or the like, the handle extending laterally or radially external to the valve body or housing, and including a detent mechanism having a detent element configured and operable for detaining or holding the handle and thus the valve member in a selected rotational position in engagement with the notch plate of the invention located on the valve body or housing. Typically, the detent element is located on or controllable by a lever of the mechanism and movable between a locking position and an unlocking position by movements of the lever.

According to another preferred aspect of the invention, the notch plate is disposed on the valve body or housing generally, more particularly, about a housing portion containing the valve stem, and is oriented so as to be within a plane angularly oriented, e.g., perpendicular, relative to the axis of rotation of the valve member. The notch plate can be incorporated integrally with the flange about the valve stem housing, but could be configured as a separate element removably attachable to the flange or another aspect of the valve body or housing, in a suitable manner, such as, but not limited to, using fasteners or the like. The notch plate can also be mounted to the valve stem body or housing by welding. The notch plate has a radial outer periphery disposed adjacent to the detent element of the handle. As the name implies, the notch plate includes a row or pattern of notches disposed about the rotational axis, each notch adapted for cooperatively receiving the detent element when in the locking position, for holding the handle and thus the valve stem and valve member in a selected rotational position about the rotational axis.

As another preferred aspect of the invention, at least one of the notches comprises an intermediate notch, that is, a notch open radially outwardly and in one axial direction relative to the rotational axis of the valve only, so as to be spanned or bridged on the opposite axial side by the notch plate, to provide strength and durability sufficient to withstand abuse such as hammer blows, kicking and the like, without breaking or significant deforming of the surrounding structure. The intermediate notch or notches are located in the radial outer periphery of the notch plate, incorporated in either a continuous arcuate periphery or edge, or in a radial outer tip or tips of radially or laterally extending fingers that likewise are sufficiently strong and robust so as to be capable of withstanding hammer blows, kicks, and other abuse. The fingers, in turn, define and bound through notches that extend completely through the notch plate and are also adapted respectively for cooperatively receiving the detent element, which combined with the intermediate notches, provides a large number of valve positions.

According to another preferred aspect of the invention, the arcuate radial outer periphery of the notch plate and/or at least the tips of the fingers (if used) are disposed along an arcuate path of movement of the detent element, and more preferably, between the handle and the detent element, to position the notches for receiving the detent element when aligned therewith, respectively. To position the valve member in a desired orientation, the release lever is aligned with either an intermediate notch or a through notch, and pivotal movement of the detent element (by releasing the lever) to the locking position will position the detent element in the notch so as to lock or hold the handle in that position. As a non-limiting exemplary embodiment, a notch plate can include nine or ten intermediate notches, providing a fully closed valve position, a fully open position, and seven or eight partially open positions.

In another contemplated configuration, one or more conventional through notches, that is, notches that extend completely through the notch plate, are used in combination with one or more intermediate notches. As a non-limiting example, a through notch can be used at the fully closed valve position, with the remaining notches being intermediate notches. As another alternative, through notches can be used at the fully open and fully closed positions, while intermediate notches are used for the partially open positions. In both instances, any number of the intermediate notches that can be accommodated in the space available can be used.

In still another configuration, the radial outer periphery of the notch plate comprises at least one radially extending finger defining the side of a through notch, and incorporates an intermediate notch or notches into the tip or radial outer portion of the finger, that is, in a radially outwardly facing surface and an axially facing surface thereof, such that material of the finger bridges or spans one side of the notch for strength and durability. As a non-limiting example here, the notch plate can include four fingers so as to have five notches and four intermediate notches, for a total of 9 valve positions, including a fully closed position, a fully open position, and seven partially open positions. Advantages of this configuration include that it provides a wide range of adjustability, and the notch plate, including both the through notches and the intermediate notches can be cast of aluminum and other common materials.

As another preferred aspect of the invention, the edges of the radial outer peripheral surfaces of the fingers of the notch plate adjacent to the detent element optionally include a chamfer along the widths thereof, to provide clearance for passage of the detent element when in the unlocking position and as the handle is rotated through its range of positions past the respective fingers.

As another preferred feature, the endmost notches of the notch plate are defined and bounded on one side by travel stops which are configured and operable for preventing rotational movement of the handle past the respective stop, which thus restricts the range of movement of the handle to that notch and correspondingly the range of movement of the valve member. The travel stops are preferably integral with the notch plate and are more robust to provide enhanced strength, and can, for instance, project radially outwardly beyond the fingers, so as to be positioned for abutting contact with an adjacent aspect of the handle.

As a non-limiting example, the notch plate in any of the above configurations can be cast of aluminum and other materials, in a thickness from about 0.5 to about 0.8 inch, to provide robust strength.

As a result of the invention, an improved notch plate is provided that is no larger than weaker existing notch plates, but which will provide much more robust strength and service.

BRIEF DESCRIPTION OF THE DRAWINGS

FIG. 4 is an end view of a valve body of the valve, showing the notch plate;

FIG. 5 is another end view of the valve body, showing the notch plate;

FIG. 6 is a sectional view of the valve body, taken along line 6-6 of FIG. 5;

FIG. 11 is a top view of the notch plate;

FIG. 12 is a side view of the notch plate;

FIG. 13 is a bottom view of the notch plate;

DETAILED DESCRIPTION OF PREFERRED EMBODIMENTS OF THE INVENTION

Figure 1:
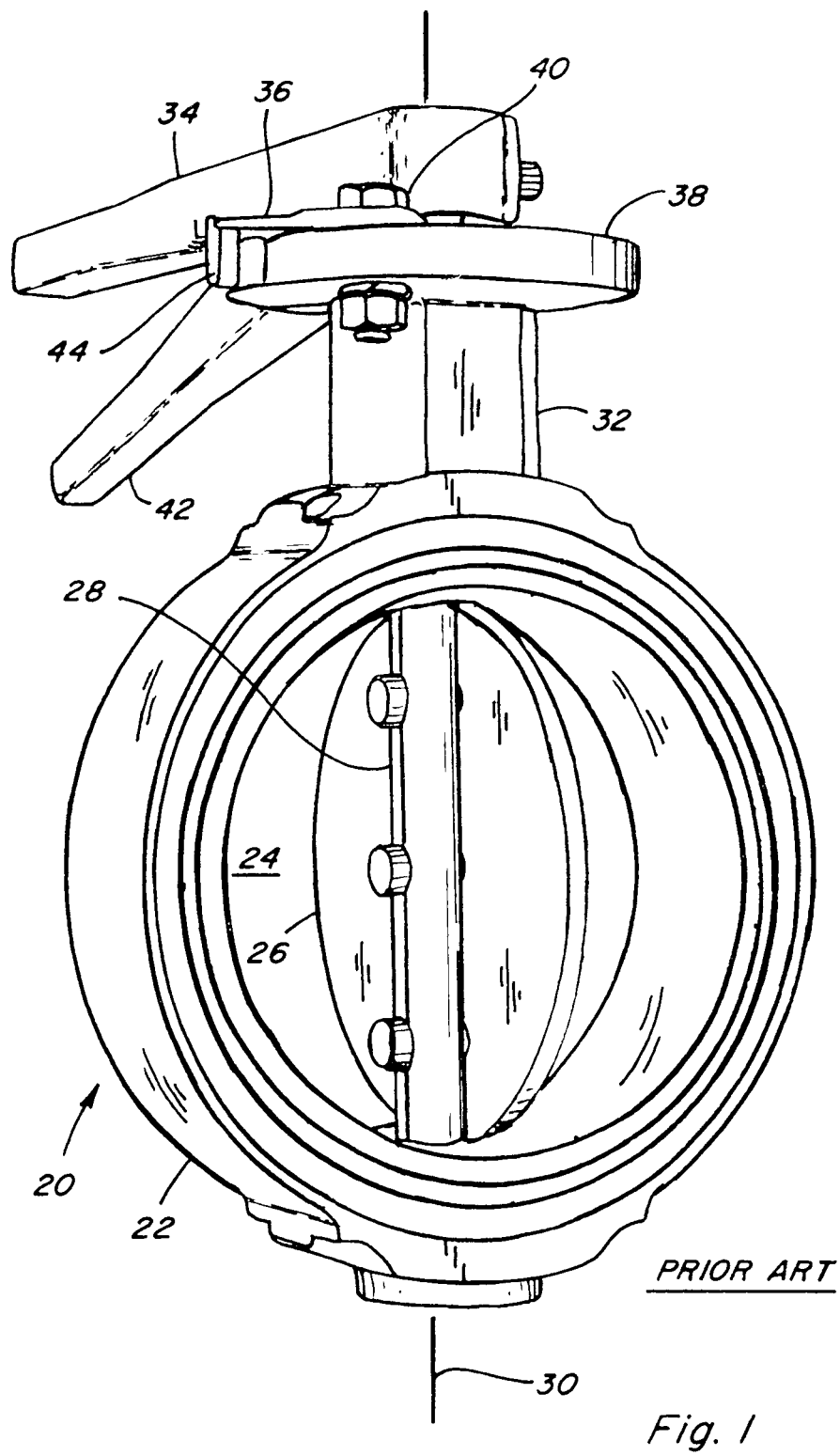
FIG. 1 is a perspective view of a representative valve having a prior art notch plate.
Figure 2:
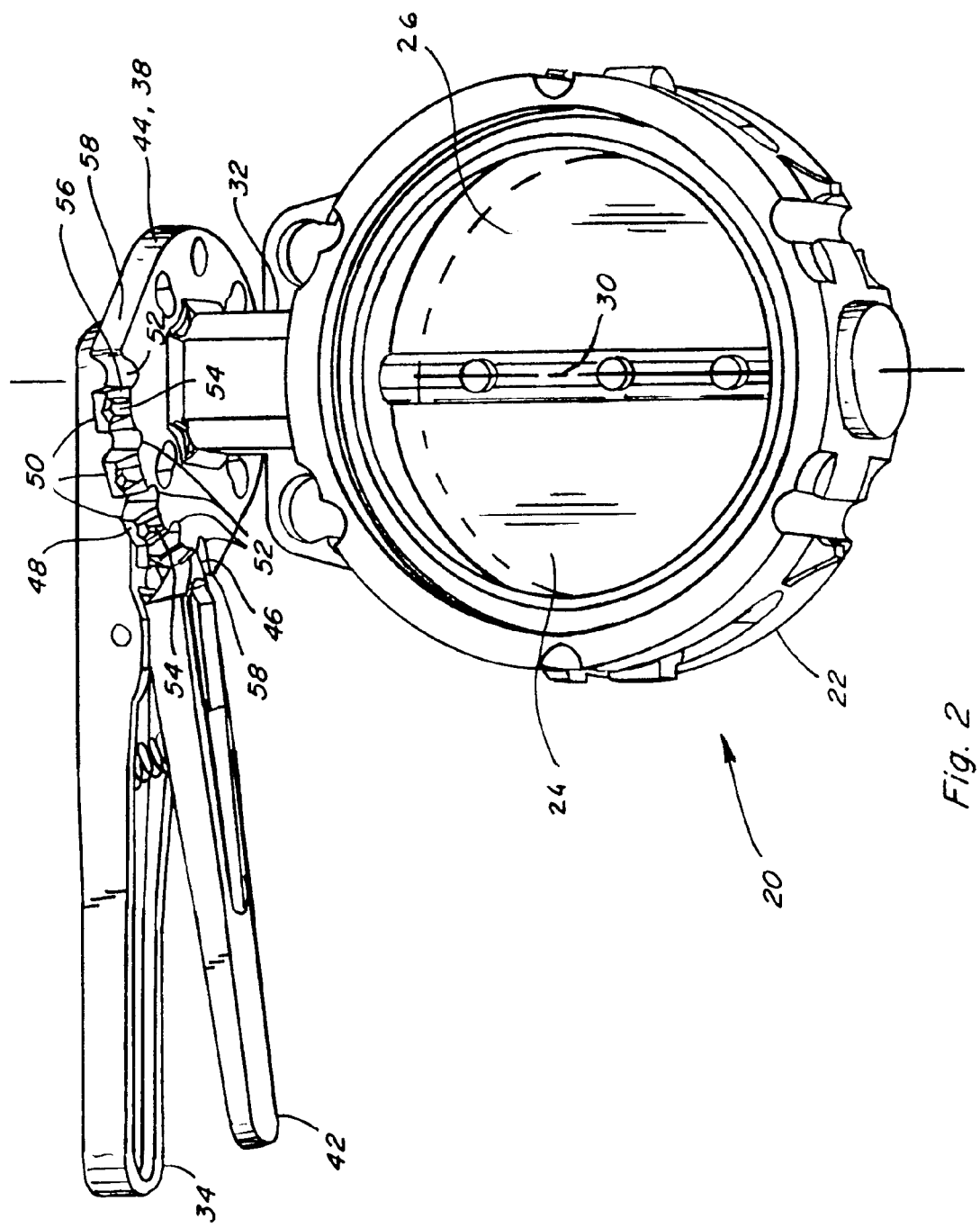
FIG. 2 is a perspective view of a representative valve having a notch plate of the invention, showing a detent element of a detent mechanism on a handle of the valve engaged with a notch between two fingers of the notch plate.
Figure 3:
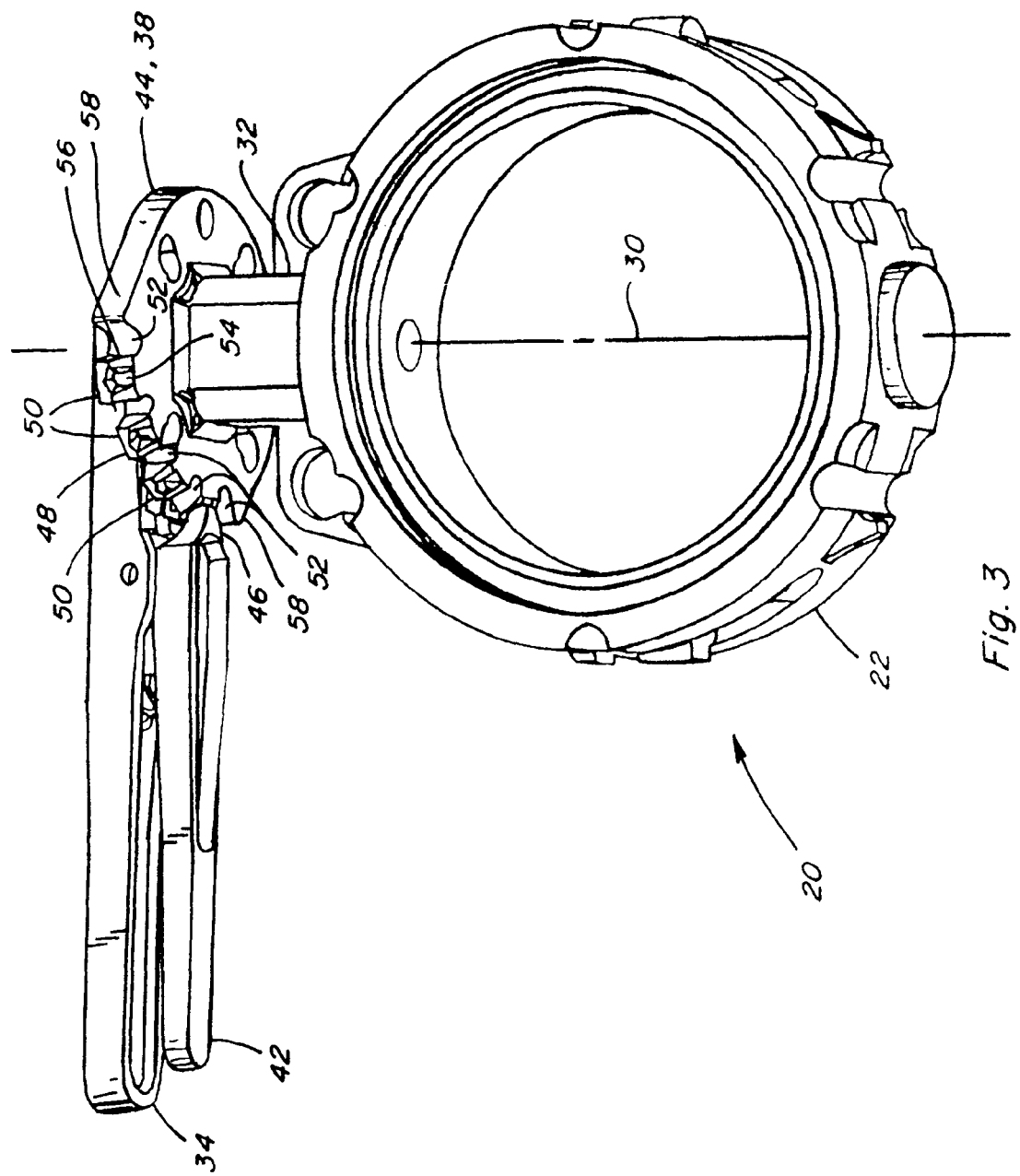
FIG. 3 is another perspective view of the valve of FIG. 2, showing the detent element engaged with an intermediate notch on a finger of the notch plate.
Figure 7:
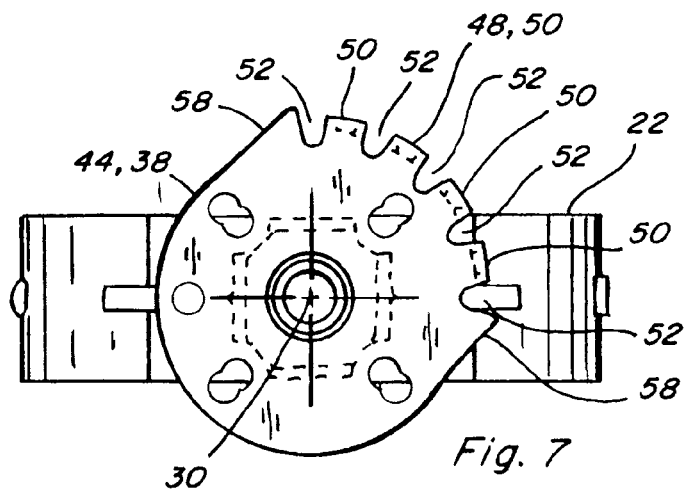
FIG. 7 is a top view of the valve body, showing aspects of the notch plate.
Figure 8:
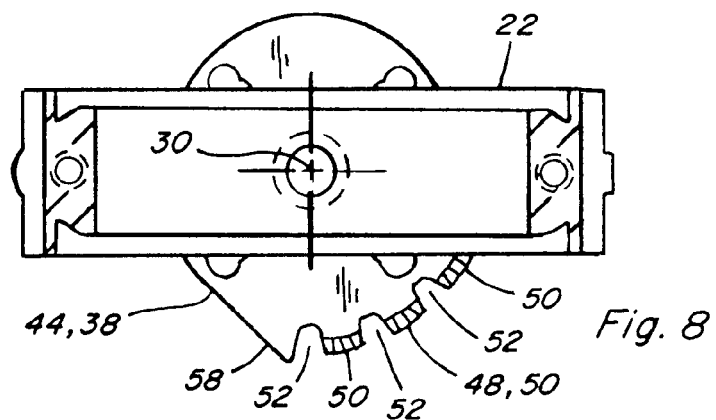
FIG. 8 is a sectional view of the valve body, taken along line 8-8 of FIG. 5.
Figure 9:
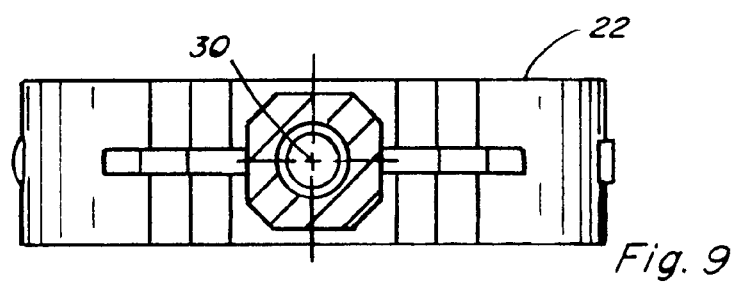
FIG. 9 is a sectional view of the valve body, taken along line 9-9 of FIG. 5.
Figure 10:
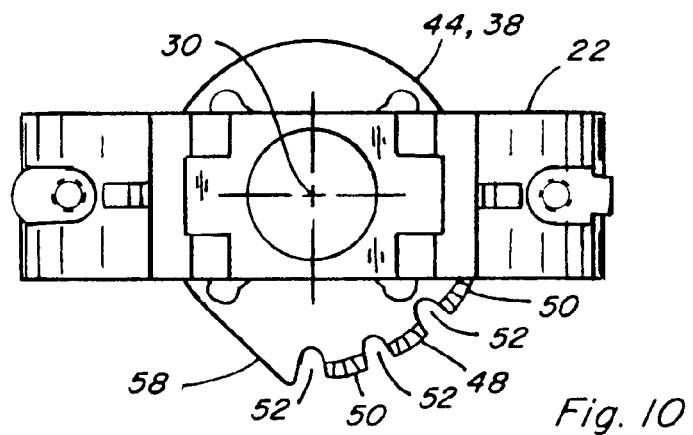
FIG. 10 is a bottom view of the valve body, showing aspects of the notch plate.

In FIG. 1, a representative prior art valve 20 is shown. Valve 20 includes a body 22 extending about a flow passage 24. A valve member 26, which can be, but is not limited to, a butterfly type member, or a ball type member, is disposed in flow passage 24, and is movable relative to the valve body 22 through a range of positions between a fully closed position (not shown) and a fully open position (shown). Such movement preferably comprises about a 90 degree rotational movement and is effected by a valve stem 28 connected to the valve member 26 and supported for rotation about a rotational axis 30. The valve stem 28 extends through a valve stem body or housing 32 connected to the valve body 22. A handle 34 is mounted on and extends radially from the stem external to the stem body or housing 32, and includes a detent element 46 (see FIGS. 2 and 3) configured and operable for detaining or holding the handle 34 and thus the valve member 26 in a selected rotational position in engagement with a notch plate 36 mounted to the top of housing 32. The notch plate 36 is of well-known construction and here, is a removable member mounted to a flange 38 of housing 32 by fasteners 40. Here, fasteners 40 include a bolt which passes through aligned holes in plate 36 and flange 38 and threadedly engages a nut on the opposite side, as illustrated. Similarly to aspects of the invention which will be explained, notch plate 36 includes a plurality of spaced apart fingers which extend radially outwardly from flange 38 relative to axis 38, which fingers define notches therebetween adapted for receiving the detent element 46 of the handle 34. As will also be explained, the detent element 46 of handle 34 essentially comprises a bullet shaped tip or pin on a release lever 42 pivotally connected to handle 34 and pivotally movable by squeezing toward handle 34 against a spring between the handle and lever, into an unlocking or release position retracted from notch plate 36, to allow rotating handle 34 and thus stem 28 and valve member 26 to a desired position. When handle 34 is positioned such that the detent element 46 is aligned with a selected notch of notch plate 36, release lever 42 can be released, such that the detent element 46 will pivot into a locking position cooperatively received in the selected notch, to hold handle 34, stem 28, and valve member 26 in the selected position. Notch plate 36 additionally includes travel stops 44 at the opposite ends of a range of rotary motion thereof, positioned to abut release lever 42 to limit the range of rotational motion of release lever 42, handle 34, and thus valve member 26, all in the well-known manner. Here, notch plate 36, including the fingers and travel stops 44 thereof, are relatively thin and weak, and will typically be cast or stamped from steel. As a result, notch plate 36 is susceptible to damage from hammer strikes and kicking as explained above.

It should be noted that valve 20 is intended to be representative of a wide range of valves with which the present invention can be used, including, but not limited to, butterfly type valves and ball types. Additionally, it should be noted that the notch plate of the present invention is contemplated for use with a wide variety of handle and detent element configurations, and that the handle and detent mechanism illustrated and explained herein is not intended to be limiting to the invention in any manner whatsoever.

Referring also to FIGS. 2, 3, 4, 5, 6, 7, 8, 9 10, 11, 12, 13, 14, 15 and 16, valve 20 is illustrated including an improved notch plate 44 constructed and operable according to the teachings of the invention. Here, it should be observed that in FIG. 3, the valve member and stem are deleted for simplicity, and that in FIGS. 4 through 13, the handle, stem and valve member are deleted for simplicity, but that all of these elements would be part of a complete valve with which the invention would be used.

Figure 17:
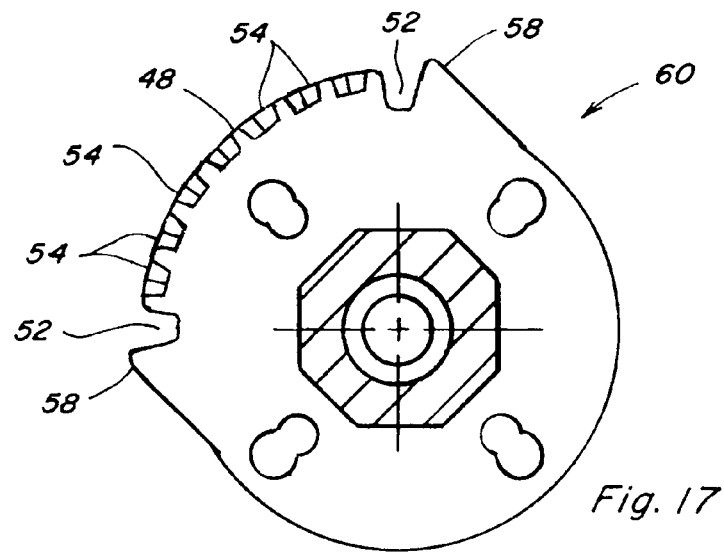
FIG. 17 is a bottom view of the notch plate with an alternative configuration of notches according to the invention.

The notch plate 44 is disposed on the stem body or housing 32 generally within a plane angularly oriented, e.g., perpendicular, relative to axis of rotation 30 of the valve stem 28. Here, notch plate 44 is illustrated incorporated integrally with flange 38, but it should be understood that the notch plate could be configured as a separate element removably attachable to flange 38 or another aspect of valve 20, in a suitable manner, such as, but not limited to, using fasteners as just explained, and as illustrated in FIG. 17. The notch plate 44 can also be mounted to the valve stem body or housing 32 by welding. The notch plate 44 has a radial outer periphery 48 on distal ends of a plurality of spaced apart fingers 50 extending laterally so as to be disposed adjacent to the detent element 46 of the handle 34. Preferably, fingers 50 project radially outwardly in relation to the rotational axis 30, and define multiple through notches 52 extending through the notch plate and adapted for cooperatively receiving the detent element 46 when in the locking position, for holding the handle 34 and thus the valve stem 28 and valve member 26, in a selected rotational position about the rotational axis 30.

Figure 14:
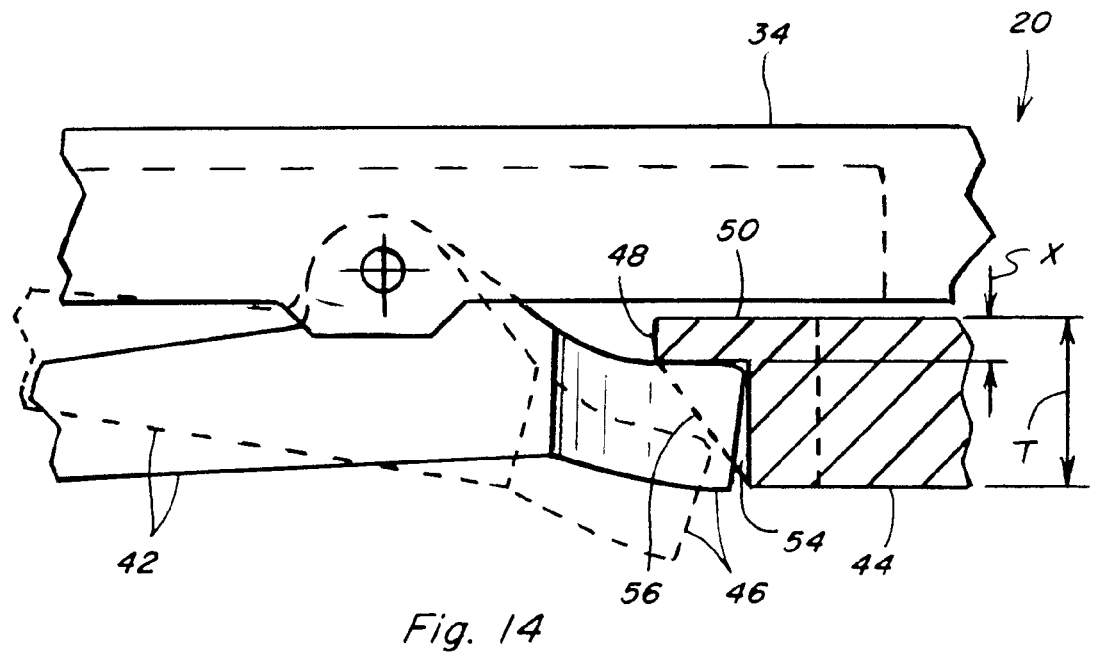
FIG. 14 is a sectional view of the notch plate, showing a detent element received in a notch.
Figure 15:
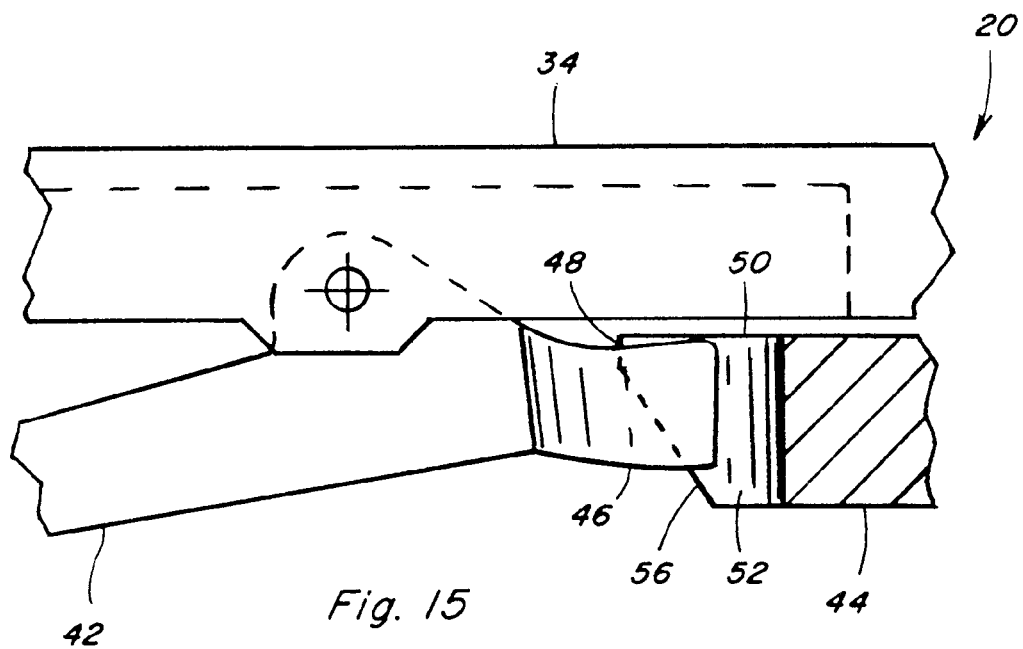
FIG. 15 is another sectional view of the notch plate and handle of the valve showing the detent element of the handle received in a notch.
Figure 16:
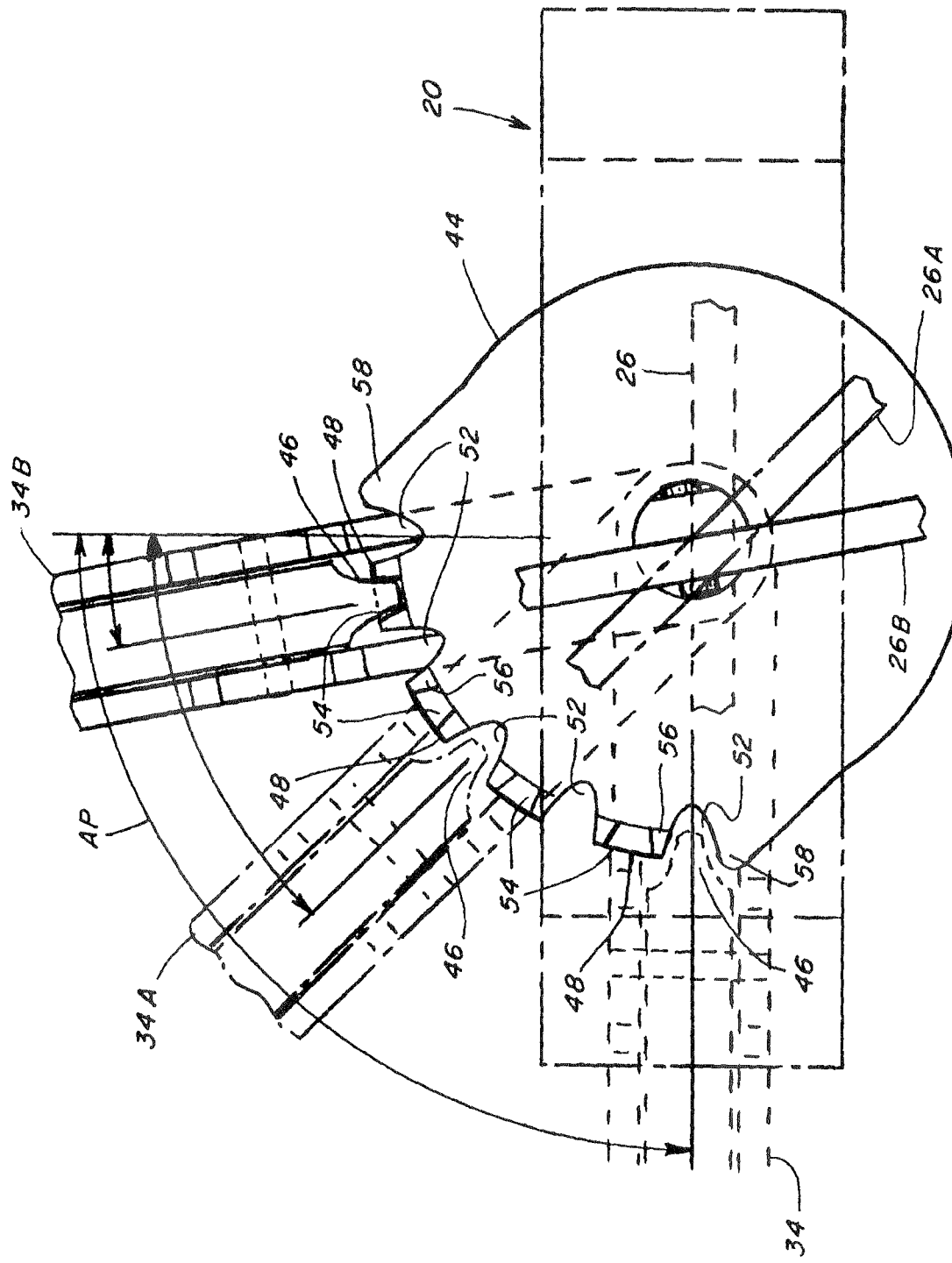
FIG. 16 is a bottom view of the notch plate and handle showing the detent element received in a notch.

Individual ones of the fingers 50 additionally include intermediate notches 54 extending only partially into the end portions of the respective fingers 50 and adapted for cooperatively receiving the detent element 46, forming an alternating pattern of through notches 52 and intermediate notches 54. The intermediate notches 54 are formed in a manner only partially extending through the fingers 50, such that fingers 50 are strong, and resistant to damage from abuses such as kicking and striking with a hammer or other tool. This strength is achieved in part by forming the intermediate notch 54 in the radial outer periphery 48 and only one axially facing surface of respective fingers 50 of the notch plate 44 as shown, in a position such that when the handle 34 and detent element 46 (in the unlocking position) are positioned in alignment with the respective intermediate notches 54, pivotal movement of the detent element 46 (by releasing the lever) to the locking position will position the detent element 46 in the respective notch 54 so as to lock or hold the handle 34 in that position. This is best shown in FIGS. 14, 15 and 16. Additionally, the edge of the radial outer periphery 48 of fingers 50 adjacent to the detent element 46 includes a clearance chamfer 56 along the width thereof, to provide clearance for rotary movement of the detent element 46 when in the unlocking position and as the handle 34 is rotated through its range of positions, as denoted by arcuate path AP in FIG. 16. In that figure, it can be observed that handle 34 and thus valve member 26 can be rotated and locked or retained in a range of different angular or rotary positions by cooperative engagement with respective notches 52 and 54, for allowing different amounts of flow through valve 20, as represented by the position of handle 34A and valve member 26A; and handle 34B and valve member 26B.

As another feature, the endmost notches 52 of the plate 44 are defined and bounded on one side by travel stops 58 which are configured and operable for preventing rotational movement of the handle 34 past the respective stop, which thus restricts the range of movement of the handle to that notch and correspondingly the range of movement or length of arcuate path AP of the valve member (FIG. 16). The travel stops 58 are preferably integral with the notch plate 44 and are thick and robust to provide enhanced strength, and can, for instance, project radially outwardly beyond the radial outer periphery 48 of fingers 50, so as to be positioned for abutting contact with an adjacent aspect of the handle, which here will be detent element 46.

As another feature, the handle 34 is connected to valve stem 28 in an orientation such that the detent element 46 is located adjacent to the axially facing surface of notch plate 44 closest to the valve body 22, and will follow an arcuate path as handle 34 is rotated about rotational axis 30, denoted by arcuate arrow AP in FIG. 16. Intermediate notches 54 are formed in radial outer peripheries 48 of fingers 50 so as to be in radially coincident overlapping relation with detent element 46 when in an unlocking or release position (shown in dotted lines in FIG. 14), and handle 34. This allows portions of fingers 50 of the notch plate 44, denoted by thickness T in FIG. 14, to span the respective intermediate notches 54, to be robust and strong so as to be less susceptible to damage from hammer strikes and the like. As a non-limiting example, the notch plate 44 can have a thickness T (FIG. 14) of between about 0.5 inch and 0.8 inch or greater, and the portion of the notch plate spanning the intermediate notches 54 can have a thickness X of at least about 10 percent and preferably about 20 percent to 30 percent of thickness T when fabricated of aluminum, to provide adequate robustness and strength for enduring hammer strikes and the like without significant deformation or damage. As another non-limiting example, the notch plate 44 can include four fingers 50 so as to have five notches 52 and four intermediate notches 54, for a total of 9 valve positions, including a fully closed position, a fully open position, and seven partially open positions. As a result of the invention, an improved notch plate is provided that is no larger than weaker existing notch plates, but which will provide much more robust strength and service, with more valve positions.

It can be observed that detent element 46 and intermediate notches 54 have matingly engageable shapes, here depicted as a bullet shape, and can have a variety of alternative mating shapes, as desired or required for a particular application.

Figure 18:
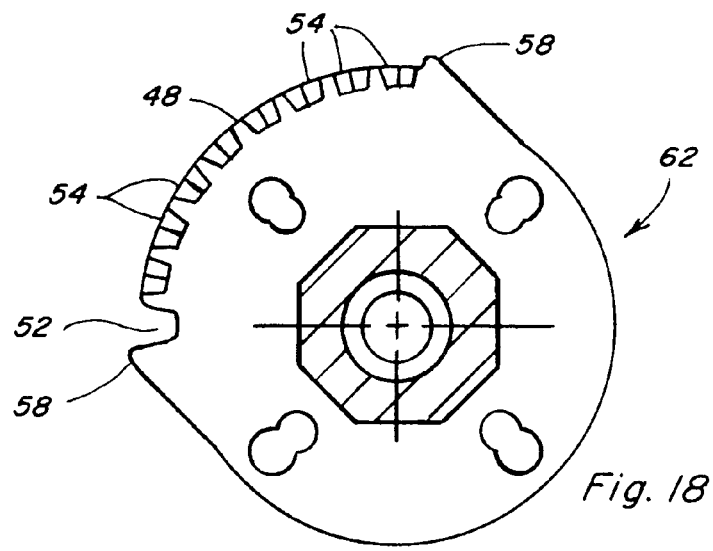
FIG. 18 is a bottom view of the notch plate with another configuration of notches according to the invention.
Figure 19:
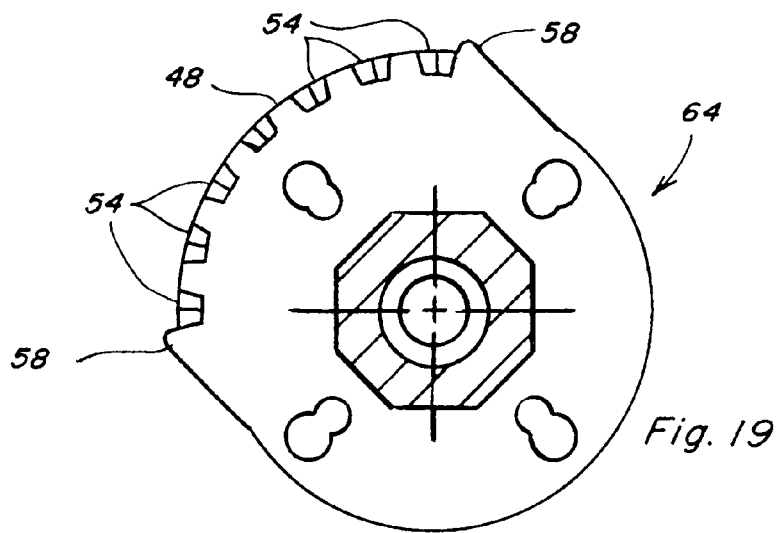
FIG. 19 is a bottom view of the notch plate with still another configuration of notches according to the invention.

Referring also to FIGS. 17, 18 and 19, alternative notch plates 60, 62 and 64 are shown, like part of notch plates 60, 62, 64 and 44 being identified by like numerals. Notch plates 60, 62 and 64 can be integrally formed with a valve body 22, e.g., by casting, or can be a separate element attachable thereto in a suitable manner such as using fasteners or the like. Notch plate 60 differs from notch plate 44 by the provision of only two through notches 52 through radial outer periphery 48 of the notch plate, disposed respectively, adjacent to travel stops 58, respectively, corresponding to the fully open valve position and the fully closed position. A plurality of intermediate notches 54 are provided in periphery 48, each notch 54 being open in the radial outer direction and in just one axially facing direction in the above described manner and as shown in FIG. 14, providing a total of 9 valve positions.

Notch plate 62 differs from notch plate 44 by the provision of only one through notch 52 through radial outer periphery 48, disposed adjacent to one of the travel stops 58, here corresponding to the fully closed position. A plurality of intermediate notches 54 are provided in periphery 48, each notch 54 being open in the radial outer direction and in just one axially facing direction, again in the above described manner as illustrated in FIG. 14, providing a total of 9 valve positions.

Notch plate 64 differs from notch plate 44 by eliminating the through notches 52, and instead providing a plurality of intermediate notches 54 in periphery 48, each notch 54 again being open in the radial outer direction and in just one axially facing direction in the above described manner (FIG. 14), providing a total of 7 valve positions.

Each of the notch plates 60, 62 and 64 can be used in the above described manner, namely, between the handle 34 and detent element of the detent mechanism, for detaining handle 34 in desired positions corresponding to the respective notches 52 and 54. Because successive intermediate notches 54 are used, in these embodiments, radial outer periphery 48 of the notch plate comprises a relatively long continuous structure, compared to the intermittent tips of fingers 50 of plate 44, so as to also be capable of withstanding damage from hammer blows and the like. Here, it should be recognized and understood that although the notch plate embodiments shown include 9 or 7 total notches, other numbers of notches can be provided, as desired or required for a particular application.

Figure 20:
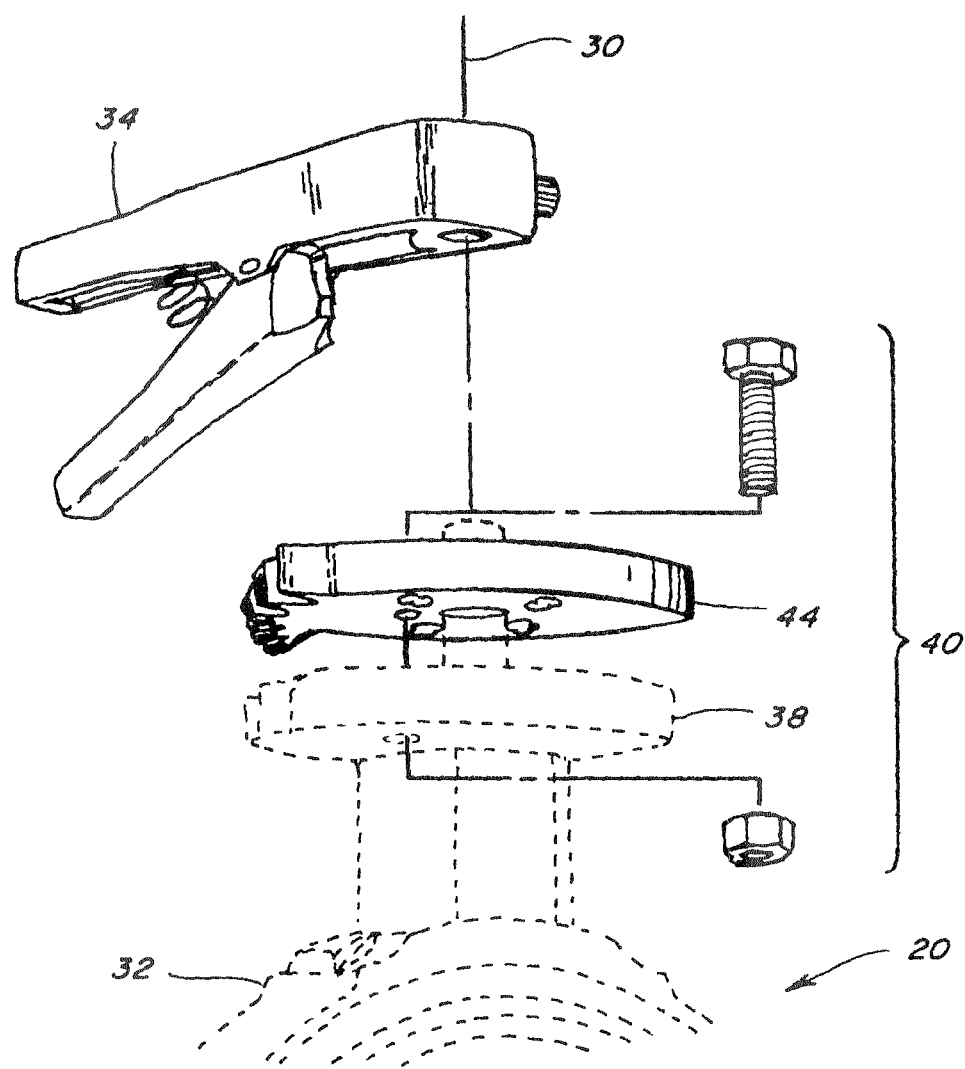
FIG. 20 shows an alternative embodiment of the notch plate, showing a manner of installation thereof on a flange of the valve body shown in dotted lines, and showing a handle of the valve.

Referring also to FIG. 20, notch plate 44 is alternatively illustrated as configured as mounted to flange 38 of housing 32 by fasteners 40. Again, fasteners 40 include a bolt which passes through aligned holes in plate 44 and flange 38 and threadedly engages a nut on the opposite side, to align notch plate 44 about axis 30, and allow easy removal and replacement.

In the past, due to space constraints, a narrower and thus weaker detent element 46 was required for those notch plates having a greater number of notch positions, e.g., 10, as opposed to the 5 position plate that could utilize a wider and more robust detent element. As another advantage of the invention, because the intermediate notches are incorporated into the peripheral edge or fingers of the notch plate beside the through notches, handles having the wider, stronger detent elements can be used, to reduce occurrences of failure of that component also.

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A valve comprising:
    a handle extending laterally from and supported on a valve body for rotation about an axis for rotating a valve member thereabout through a range of rotary movement, and a detent mechanism having a detent element disposed on the handle and movable along an arcuate path about the axis as the handle is rotated thereabout, the detent mechanism being configured so as to be selectably operable for moving the detent element between an unlocking position and a locking position;
    a notch plate supported on the valve body and extending generally laterally relative to the axis adjacent to the handle, the notch plate including a generally arcuate radial outer periphery located between the handle and the detent element of the detent mechanism generally coextensive with the arcuate path and including a plurality of intermediate notches therealong disposed for cooperatively receiving and holding the detent element when in the locking position and aligned therewith, respectively, each of the intermediate notches being open in a radially outwardly facing direction and in a first axial direction only so as to be enclosed in an axial direction opposite the first axial direction, and the detent element being releasable from the intermediate notches, respectively, by movement to the unlocking position; and
    wherein at least one of the intermediate notches is disposed on a radial outer tip of a radially extending finger of the notch plate, bounding at least one through notch extending completely through the notch plate.

2. The valve of claim 1, comprising a plurality of the fingers.

3. The valve of claim 2, wherein the generally arcuate radial outer periphery comprises radial outer tips of the fingers.

4. The valve of claim 1, wherein the valve member is a butterfly valve member.

5. The valve of claim 1, wherein the valve member is a ball valve member.

6. The valve of claim 1, wherein the notch plate is integral with the valve body.

7. The valve of claim 1, wherein the notch plate is a separate element attached to the valve body.

8. The valve of claim 1, wherein the notch plate includes at least one integral travel stop adjacent an end of the arcuate path, configured to cooperatively engage the handle to prevent movement therepast.

9. The valve of claim 8, further comprising a second one of the travel stops adjacent to a second end of the arcuate path.

10. The valve of claim 1, wherein the notch plate has an axial thickness of between about 0.5 inch and about 0.75 inch.

11. The valve of claim 1, wherein the detent element has a bullet shape of a predetermined size, and the intermediate notch has a corresponding bullet shape of a marginally larger size than the bullet shape of the detent element so as to be configured for matingly receiving the detent element.

12. A valve comprising:

a handle supported on a valve body extending laterally relative to an axis, the handle being connected to a valve member disposed within a passage of the valve body, the handle being rotatable about the axis for moving the valve member through a range of positions, and a detent mechanism disposed on the handle, the detent mechanism including a detent element spaced axially from the handle and located a predetermined radial distance from the axis and movable along an arcuate path as the handle is rotated about the axis for moving the valve member, the detent mechanism being configured and operable for selectably moving the detent element along a path between an unlocking position spaced a first distance from the handle and a locking position closer to the handle;

a notch plate fixed to the valve body and extending generally laterally therefrom, the notch plate including a plurality of fingers having end portions positioned to be located along the path of the detent element when aligned therewith, respectively, adjacent ones of the fingers defining notches therebetween configured for cooperatively receiving and holding the detent element when aligned therewith in the locking position, such that the adjacent fingers will hold the handle in selectable rotary positions, respectively, and at least one of the fingers bounding at least one through notch extending completely through the notch plate including an intermediate notch extending only partially through a radial outer tip of the end portion thereof configured for cooperatively receiving the detent element when aligned therewith in the locking position, for holding the handle in an additional selectable rotary position.

13. The valve of claim 12, wherein each of the fingers includes one of the intermediate notches.

14. The valve of claim 12, wherein the intermediate notch is located in a radial outwardly facing surface of the finger.

15. The valve of claim 12, wherein the intermediate notch is located in an axially facing surface of the finger.

16. The valve of claim 12, wherein the valve member is a butterfly valve member.

17. The valve of claim 12, wherein the valve member is a ball valve member.

18. The valve of claim 12, wherein the notch plate is integral with the valve body.

19. The valve of claim 12, wherein the notch plate is a separate element attached to the valve body.

* * * * *